Feb. 14, 1950

R. F. SHEA 2,497,693

BILATERAL CLIPPER CIRCUIT

Filed Feb. 16, 1949

Inventor:
Richard F. Shea,
by Merton D. Moore
His Attorney.

Patented Feb. 14, 1950 2,497,693

UNITED STATES PATENT OFFICE 2,497,693

BILATERAL CLIPPER CIRCUIT

Richard F. Shea, Fairfield, Conn., assignor to General Electric Company, a corporation of New York Application February 16, 1949, Serial No. 76,728

4 Claims. (Cl. 178—44)

This invention relates to electrical filters and particularly to filters of the clipping or limiting type for use in electronic apparatus generally.

My invention finds particular application in pulsed systems wherein it is desirable to trigger a circuit upon the occurrence of certain pulses and to maintain the circuit inoperative for all other signals. My invention is closely related to the type of circuits commonly known in the art as clipping or limiting circuits, and it functions to effectively reject all pulses supplied to its input except those pulses whose magnitude exceeds a predetermined value. It finds particular application in the excitation of high speed oscilloscopes from repetitive pulse signals in the presence of noise, as it insures an accurate trigger on the desired signal rather than on random noise peaks.

It is therefore a general object of my invention to provide a circuit for eliminating the undesired effects of random signals superimposed upon a series of pulses and for translating only desired pulses which have a greater magnitude than the random signals.

Another object of my invention is to provide an electronic filter for eliminating all signals within an intermediate band of amplitudes, passing only signals of higher or lower value.

A further object of my invention is to provide an electronic filter for selecting, from a train of pulses of varying magnitudes and of positive and negative polarities, those pulses which are more positive than a certain positive value or which are more negative than a certain negative value.

For further objects and advantages, and a better understanding of the invention, attention is now directed to the following description and accompanying drawing, and also to the appended claims in which the features of the invention believed to be novel are more particularly pointed out.

In the drawing—

Figure 1:
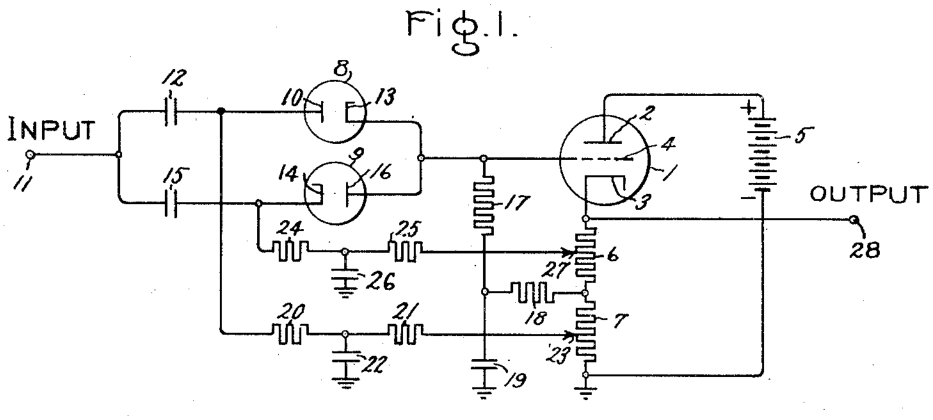
Fig. 1 is a schematic circuit of an embodiment of my invention.

Referring now to Fig. 1, there is shown an electronic discharge device 1, having an anode 2, a cathode 3, and a control electrode 4. Device 1 is connected in a cathode-coupled type of amplifying circuit, and operating potential is supplied to it from a battery 5 whose positive terminal is connected to the anode 2 and whose negative terminal is grounded. Cathode 3 is connected to ground through a pair of potentiometers 6 and 7, connected in series. The input circuit to device 1 is made through a pair of diodes 8 and 9. Diode 8 has an anode 10 connected to an input terminal 11 through a capacitor 12, and a cathode 13 directly connected to the control electrode 4. Likewise, diode 9 has a cathode 14 connected to the input terminal 11 through a capacitor 15, and an anode 16 directly connected to the control electrode 4.

Cathode 13 and anode 16 of the diodes are connected through resistors 17 and 18 to the junction of potentiometers 6 and 7, the junction of these two resistors being by-passed to ground by a shunt capacitor 19. The anode 10 of device 8 is connected through a filter circuit comprising a pair of series resistors 20 and 21 and a shunt capacitor 22 to an adjustable tap 23 on potentiometer 7. Similarly, cathode 14 of device 9 is connected through a filter circuit comprising resistors 24 and 25 and capacitor 26, to a tap 27 on potentiometer 6. An output terminal 28 is provided, connected to the junction of cathode 3 and potentiometer 6.

The operation of the circuit will now be explained with reference to the curves 30 and 33 of Fig. 2. Curve 30 illustrates a series of pulses of both positive and negative polarities, with major pulses occurring at times $t_1$, $t_2$ and $t_3$. A continuous series of random noise peaks of lesser amplitudes occurs during the intervals between the major pulses. It is desired that, when this series of pulses is applied to the input terminal 11, only the pulses of larger magnitude, occurring at times $t_1$, $t_2$ and $t_3$, appear at the output terminal 28.

Referring now to the circuit of Fig. 1, the current flowing through device 1 produces a voltage drop across potentiometers 6 and 7 so that the potential at the junction of these potentiometers is intermediate between that existing at cathode 3 and ground. This potential is communicated to control electrode 4 by resistors 17 and 18, and thus serves to maintain cathode 13 of diode 8, and anode 16 of diode 9 at a fixed potential. The filter network comprising resistors 24 and 25 applies, to the cathode 14 of device 9, a potential which is positive to a greater or lesser extent with respect to its anode, the magnitude of this potential depending upon the setting of tap 27. In similar fashion, the filter network comprising resistors 20 and 21 applies, to the anode 10 of diode 8, a negative potential with respect to its cathode 13, the magnitude of this potential depending upon the setting of tap 23. The purpose of the filter networks is to allow unidirectional current to flow relatively unimpeded to cathode 14 and anode 10, while preventing the flow of pulse currents from the input circuit to potentiometers 6 and 7 and thereby to the output terminal 28.

When a signal, such as that illustrated by curve 30, is applied to input terminal 11, diode 8 operates as an open circuit to all negative pulses and also to those positive pulses which do not exceed in magnitude the potential or bias existing between its anode and cathode. Similarly, diode 9 operates as an open circuit for all positive pulses, and also for those negative pulses which do not exceed in magnitude the potential or bias existing between its cathode and anode. Thus, referring to Fig. 2, diode 8 operates as an open circuit for all signals except those having an amplitude more positive than that represented by line 31 in Fig. 3. Similarly, diode 9 operates as an open circuit for all signals having an amplitude more negative than that represented by line 32.

The positive peaks occurring at times $t_1$ and $t_3$ exceed in the positive direction the amplitude represented by line 31, and accordingly cause a current to flow through diode 8. Pulses then appear at the control electrode 4, and these pulses are reproduced at cathode 3 and accordingly appear at the output terminal 28, as illustrated by the pulses in curve 33 occurring at times $t_1$ and $t_3$. In a similar fashion the pulse occurring at time $t_2$ is transmitted through the diode 9 and also appears at the output terminal 28, as illustrated by the negative pulse in curve 33 occurring at time $t_2$.

Figure 2:
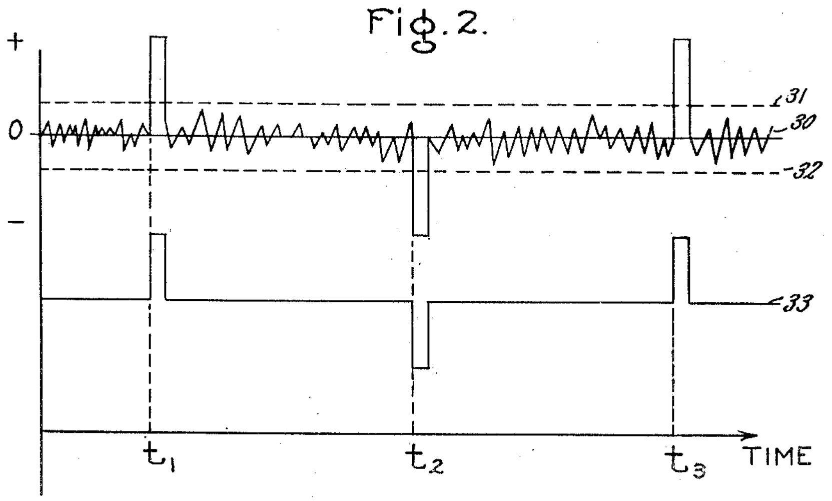
Fig. 2 shows, in graphic form, the general character of an input signal comprising the signal impulses and undesired random noise voltages, and also the output signal from the electronic filter of Fig. 1, the curves being drawn to a common time scale.

Thus the circuit of Fig. 1 eliminates all signals within the intermediate band of amplitudes indicated by the lines 31 and 32 in Fig. 2. The limit defined by these lines can be changed by varying the setting of taps 27 and 23 on potentiometers 6 and 7 respectively. Thus, moving tap 27 on potentiometer 6 closer to the junction point with potentiometer 7, lessens the positive bias on diode 9, so that a signal of lesser negative amplitude is transmitted therethrough. This is equivalent to moving line 32 closer to the zero or origin line. Similarly, moving tap 23 on potentiometer 7 closer to the junction point with potentiometer 6, decreases the negative bias on diode 8, so that a signal of lesser positive amplitude is transmitted therethrough. Likewise this is equivalent to moving line 31 closer to the zero or origin line in Fig. 3. Thus the extent of the intermediate band of amplitudes which is rejected by the filter circuit can be varied at will, and the filter transmits only those signals having an amplitude greater than the limits of this band.

While a particular embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. A filter circuit comprising an input terminal adapted to receive electrical pulses of varying magnitude, an electronic discharge device having a cathode, an anode and a control electrode, a source of operating potential for said device, a resistance serially connected between said cathode and said source, a pair of unilateral conducting devices having one pair of unlike poles connected to said control electrode and another pair of unlike poles connected through individual capacitances to said input terminal, and impedances, capable of carrying unidirectional current, connecting, respectively, said control electrode to an intermediate point in said resistance and said other pair of unlike poles to points in said resistance on either side of said intermediate point.

2. An electronic filter system for selecting, from a train of pulses of varying magnitudes and of positive and negative polarities, those pulses which are more positive than a certain positive value and those pulses which are more negative than a certain negative value, comprising an input terminal adapted to receive said train of pulses, an electron discharge device having an anode, a cathode, and a control electrode, a source of operating potential for said device, said source having a positive terminal connected to said anode and a negative terminal connected to ground, a resistance connecting said cathode to ground, a pair of rectifiers, each of said rectifiers having a positive and a negative pole, a common connection from the positive pole of one and from the negative pole of the other of said rectifiers to said control electrode, a pair of capacitances connecting the other poles of said rectifiers to said input terminal, and impedances, capable of conducting unidirectional current, connecting, respectively, said common connection to a point in said resistance, the negative pole of said one rectifier to a first tap in said resistance intermediate said point and said cathode, and the positive pole of said other rectifier to a second tap in said resistance intermediate said point and ground.

3. An electronic filter circuit for translating signals which fall outside of a predetermined range of amplitudes bounded by a positive and a negative value, comprising an input terminal adapted to receive signals of varying amplitudes, an electronic discharge device having an anode, a cathode, and a control electrode, a source of operating potential for said device, said source having a positive terminal connected to said anode and a negative terminal connected to ground, a pair of rectifiers, each of said rectifiers having a positive and a negative pole, a common connection from the positive pole of one and from the negative pole of the other of said rectifiers to said control electrode, a pair of capacitances connecting the other poles of said rectifiers to said input terminal, and impedances, capable of conducting unidirectional current, connecting, respectively, said common connection to a point in said resistance, the negative pole of said one rectifier to a first tap in said resistance intermediate said point and said cathode, and the positive pole of said other rectifier to a second tap in said resistance intermediate said point and ground, said taps being adjustable to determine said values, and an output terminal provided by said cathode.

4. An electronic filter circuit for selecting, from a train of pulses, those pulses which exceed in magnitude a negative and a positive limit, comprising an input terminal adapted to receive said train of pulses, an electron discharge device having an anode, a cathode and a control electrode, a source of operating potential for said device, said source having a positive terminal connected to said anode and a negative terminal connected to ground, a first resistance connected between said cathode and ground, a pair of rectifiers, each of said rectifiers having a positive and a negative pole, a common direct connection from the positive pole of one and from the negative pole of the other of said rectifiers to said control electrode, a pair of capacitors separately connecting the other poles of said rectifiers to said input terminal, a pair of resistances with a shunt capacitance to ground connecting said common direct connection to a point in said first resistance, first and second filter networks, each of said networks comprising a pair of resistances in series and a shunt capacitor to ground, connecting, respectively, the negative pole of said one rectifier to a first tap in said first resistance intermediate said point and said cathode, and the positive pole of said other rectifier to a second tap in first resistance intermediate said point and ground, said first and second taps being adjustable to set said negative and positive limits respectively, and an output terminal provided by said cathode where said selected pulses are available.

RICHARD F. SHEA.

REFERENCES CITED

The following references are of record in the file of this patent:

UNITED STATES PATENTS

| Number | Name | Date |
|---|---|---|
| 2,171,671 | Percival | Sept. 5, 1939 |
| 2,385,211 | Konrad | Sept. 18, 1945 |
| 2,423,263 | Sprague | July 1, 1947 |